Aug. 14, 1962  H. C. JOHNSON  3,049,015
UNITIZED STATISTICAL ACCELEROMETER
Filed March 18, 1958
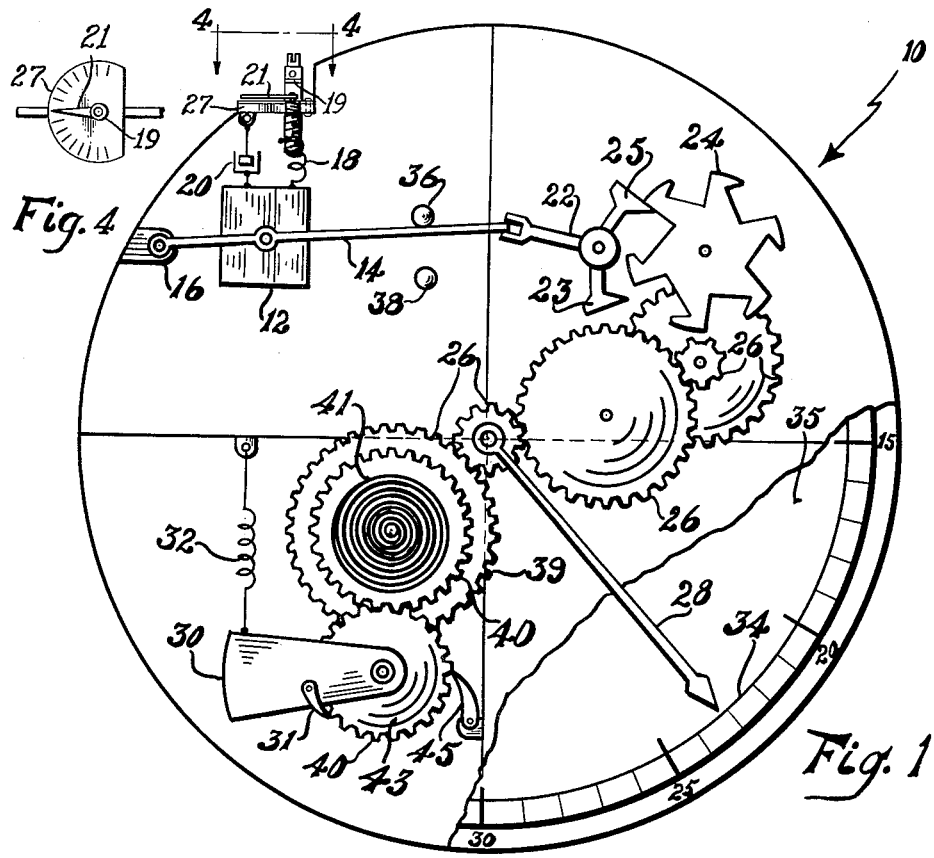
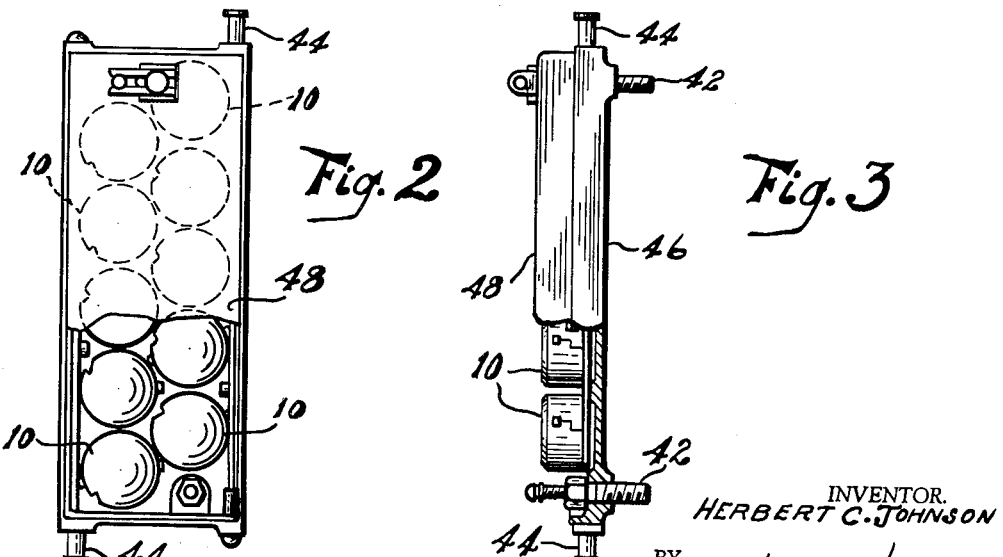
INVENTOR.
HERBERT C. JOHNSON
BY
ATTORNEYS

United States Patent Office 3,049,015
Patented Aug. 14, 1962

3,049,015
UNITIZED STATISTICAL ACCELEROMETER
Herbert C. Johnson, Minneapolis, Minn., assignor to the United States of America as represented by the Secretary of the Air Force
Filed Mar. 18, 1958, Ser. No. 722,361
1 Claim. (Cl. 73—489)

This invention concerns an accelerometer and more particularly a unitized statistical accelerometer capable of recording the number of times an operational device, such as an airplane, exceeds a given level or levels of acceleration.

In testing airplanes, or other operational devices, it is frequently necessary to have a record which can be read after the device has landed, or completed a test, of the number of times the plane or device has reached or exceeded a predetermined level or levels of acceleration.

It is an object of this invention to provide a small recording accelerometer which can be set to a predetermined level of acceleration and placed in a frame accommodating several such units, each unit being set at a different level of acceleration, to record the number of times the different acceleration levels have been reached or exceeded.

The invention consists essentially of a seismic mass mounted in a watch movement, which may be self-winding and so modified that a displacement of the seismic mass by a predetermined acceleration causes a pointer to record the fact on a dial. Magnetic damping is provided to damp out spurious displacements. The accelerometer is so small that many units may be fixed in a frame for placement in a plane or device to be tested. Each unit may be set at a predetermined level of acceleration by adjusting the tension of a spiral spring which holds the seismic mass in a steady-state position and the tension on the spring may be indicated on a dial which is calibrated for each unit in acceleration levels.

In the drawings:
FIGURE 1 is a diagrammatic view with the dial face broken away to show the essential elements of the invention;
FIGURE 2 is a diagrammatic sketch of a frame to hold several units of the invention;
FIGURE 3 is a side elevation of FIGURE 2; and
FIGURE 4 is a sectional view taken along lines 4—4 of FIGURE 1 showing the dial and pointer for indicating the acceleration level.

The drawings illustrate a preferred embodiment of the invention wherein a modified clock mechanism is provided with a weight-controlled escapement for recording or indicating the number of times that an airplane or other moving device exceeds predetermined levels of acceleration.

The various parts of each clock movement are mounted on a supporting plate or disc 10. An inertia means 12 for controlling the operation of the escapement is mounted on a lever arm 14 which is pivoted at 16 adjacent to one end thereof to the disc 10. Preferably, the weight of the mass 12 is counter balanced by a spiral spring 18, the tension of which may be varied by an adjusting screw 19. The tension on the spring 18 is sufficient to prevent displacement of the inertia mass 12 until a predetermined acceleration level has been exceeded and the predetermined level may be conveniently varied by the use of the adjusting screw 19. A pointer 21 and a dial 27 are shown in FIGURE 4 to register the predetermined acceleration level set by the adjusting screw 19. Variations in acceleration level of short duration usually are not effective to displace the mass 12. A magnetic damping device 20 is provided which prevents undesired displacement of the mass 12. Normally, the lever arm 14 is held against a stop 36 by the spiral spring 18 above referred to.

The free end of the lever 14 is arranged to be received in the forked end of one arm of a bell crank lever 22 having teeth 23, 25 thereon for controlling the rotation of an escapement wheel 24. The escapement wheel 24 is connected to a spring-powered gear 39 by a gear train 26. The gear 39 is biased for rotation by a spiral spring 41 which provides the power to operate the gear train 26 when rotation of the escapement is permitted upon displacement of the inertia mass 12. The spring 41 may be rewound manually or it may, as illustrated herein, be rewound by a displaceable weight 30 through a gear train 40. As a matter of fact, the spring 41 is rewound at the same time that the inertia mass 12 is displaced to permit operation of the escapement wheel 24. It is to be noted that the weight 30 is provided with a pawl 31 which engages teeth on the gear 43 to drive the gear 43 in a counter-clockwise direction. The weight 30 is returned to initial position by a suitable spring 32. It is to be noted also that rotation of the gear 43 in a clockwise direction is prevented by a locking pawl (45).

One of the gears in the gear train 26 is provided with a pointer 28 which is moved step-by-step in a clockwise direction as successive variations in acceleration level are exceeded to indicate the number of said variations on a scale 34 formed on the face 35 of the device.

In FIGURES 2 and 3, the numeral 42 designates bolts for attaching frame 46 to the operational device to be tested. Plungers 44 lock and unlock the units in the frame 46, and 48 is a cover for the said frame.

In operation, when the airplane or operational device to which the frame 46, carrying any number of units, is attached moves forward, the seismic weight or mass 12 tends to remain in place, held by inertia and the pull of the spring 18. When the acceleration exceeds the predetermined level which is set by adjusting the tension on spring 18, the trigger 22 trips to release escapement wheel 24 and allowing it to advance one tooth.

As the imposed acceleration is reduced the spring 18 returns the mass to the steady-state position against stop 36, the escapement is released one more tooth and the pointer is thus moved one full division over the scale 34. The mass 12 does not directly drive escape wheel 24 but merely releases it so that it can be driven by the spring 41 through the train of gears 26. To prevent spurious movements from actuating the device a metal plate is attached to the seismic mass and positioned between the poles of a permanent magnet which damps the movement of the mass in a well-known manner.

This accelerometer has several advantages over the prior art. Its small size, its self-contained power and recording characteristics and the fact that each unit can be set by an internal adjustment at any desired acceleration level, makes it possible to gather a spread of statistical information from a bank of these units. The accelerometers are inexpensive and easy to manufacture since the basic unit is a readily obtainable wrist watch with the balance wheel removed, the balance shaft modified, the seismic mass and its control spring and a magnet added.

Having thus described my invention, what I claim as new and desire to secure by Letters Patent of the United States is:

In a recording statistical accelerometer, a seismic mass, means pivotally supporting said seismic mass, a spiral spring means to hold said mass in initial position, an external means for positioning said spring to a predetermined acceleration level, a dial means to indicate the magnitude of the predetermined acceleration set by the said external means, a magnetic damping means, connecting means from said mass to said magnetic damping means for damping spurious vibrations, escapement means, means connecting said mass to said escapement means, a spring driven motor, a train of gears connecting said spring motor to the said escapement means, and a pointer connected in the said train of gears and movable to indicate each movement of the escapement means.

References Cited in the file of this patent

UNITED STATES PATENTS

| | | |
|---|---|---|
| 351,164 | Child | Oct. 19, 1886 |
| 1,264,439 | Reese | Apr. 30, 1918 |
| 1,343,875 | Reese | June 15, 1920 |
| 1,519,473 | Zahm | Dec. 16, 1924 |
| 1,588,767 | McGrath | June 15, 1926 |
| 1,624,219 | Cowdrey | Apr. 12, 1927 |
| 1,625,017 | Birkholz | Apr. 19, 1927 |
| 2,034,649 | Brown | Mar. 17, 1936 |
| 2,139,694 | Reid et al. | Dec. 13, 1938 |
| 2,185,732 | Huelsdonk | Jan. 2, 1940 |
| 2,244,417 | Bacon | June 3, 1941 |
| 2,302,670 | Buchanan | Nov. 24, 1942 |
| 2,487,793 | Esval et al. | Nov. 15, 1949 |
| 2,695,211 | Guttwein et al. | Nov. 23, 1954 |
| 2,704,326 | Whitson et al. | Mar. 15, 1955 |
| 2,802,204 | Kennelly et al. | Aug. 6, 1957 |
| 2,867,382 | Weaver | Jan. 6, 1959 |

FOREIGN PATENTS

| | | |
|---|---|---|
| 510,164 | France | Oct. 30, 1920 |
| 788,233 | France | July 22, 1935 |
| 762,680 | Great Britain | Dec. 5, 1956 |